M. E. ZELLER.
Trace-Carrier.

No. 202,502. Patented April 16, 1878.

Witnesses.
A. Ruppert
[signature]

Inventor.
M. E. Zeller.
per. Edson Bros.
Atty's

UNITED STATES PATENT OFFICE.

MELANCTHON E. ZELLER, OF BLUFFTON, OHIO.

IMPROVEMENT IN TRACE-CARRIERS.

Specification forming part of Letters Patent No. 202,502, dated April 16, 1878; application filed December 6, 1877.

*To all whom it may concern:*

Be it known that I, MELANCTHON E. ZELLER, of Bluffton, in the county of Allen and State of Ohio, have invented certain new and useful Improvements in Harness-Findings; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
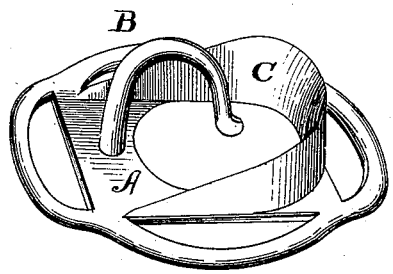
Figure 2:
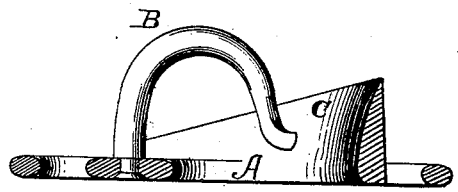

Figure 1 is a perspective view of my improved trace-carrier, and Fig. 2 is a sectional view thereof.

Corresponding parts in the two figures are denoted by like letters.

This invention relates to a certain improvement in harness attachments termed "trace-carriers;" and it consists in providing the frame of the carrier with a guard or flange, so arranged with the carrying hook or eye as to prevent the catching thereon of the switching tail of the horse, substantially as hereinafter more fully set forth.

In the annexed drawing, A marks the frame or plate of the carrier, the normal position of which is a vertical one. This frame or plate is provided with a hook or open eye, B, to receive and carry the trace, and hold it to the harness of the horse. This frame is also provided with the necessary loops for the attachment thereto of the hip and other straps of the rear portion of the harness. Fastened to and standing at right angles to the plate or frame A is a flange or guard, C, which overhangs the hook or open eye B, and is so arranged therewith as to prevent the catching thereon of the switching tail of the horse.

Having thus described my invention, what I claim, and desire to secure by Letters Patent, is—

1. A trace-carrier consisting of the plate or frame A, raised flange or guard C, and hook B, all substantially as shown and described.

2. The open plate or frame having side and end loops, and provided with an open hook or eye, and a raised flange or guard partially surrounding said hook, all substantially as and for the purpose set forth.

In testimony that I claim the foregoing as my own I hereunto affix my signature in presence of two witnesses.

MELANCTHON E. ZELLER.

Witnesses:
ADAM D. LUGIBIHL,
RICHARD R. WRIGHT.